US009046919B2

(12) United States Patent  
Niknejad

(10) Patent No.: US 9,046,919 B2
(45) Date of Patent: Jun. 2, 2015

(54) WEARABLE USER INTERFACE DEVICE, SYSTEM, AND METHOD OF USE

(75) Inventor: Ali Niknejad, Berkeley, CA (US)

(73) Assignee: HMicro, Inc., Los Altos, CA (US)

( * ) Notice: Subject to any disclaimer, the term of this patent is extended or adjusted under 35 U.S.C. 154(b) by 19 days.

(21) Appl. No.: 12/193,865

(22) Filed: Aug. 19, 2008

(65) Prior Publication Data

US 2009/0051544 A1 Feb. 26, 2009

Related U.S. Application Data

(60) Provisional application No. 60/956,806, filed on Aug. 20, 2007.

(51) Int. Cl.
*G06F 3/01* (2006.01)

(52) U.S. Cl.
CPC ...................................... *G06F 3/011* (2013.01)

(58) Field of Classification Search
CPC ............. G09G 5/00; A63F 9/224; A63F 9/02; A63F 9/0096; G06F 3/01
USPC ...................... 345/156, 157, 158; 340/539.12; 600/300
See application file for complete search history.

(56) References Cited

U.S. PATENT DOCUMENTS

| 4,313,443 | A | 2/1982 | Frosch et al. |
| 4,784,162 | A | 11/1988 | Ricks et al. |
| 5,124,128 | A | 6/1992 | Hildenbrand et al. |
| 5,231,990 | A | 8/1993 | Gauglitz |
| 5,511,553 | A | 4/1996 | Segalozitz |
| 5,717,848 | A * | 2/1998 | Watanabe et al. ............. 345/474 |
| 5,720,770 | A | 2/1998 | Nappholz et al. |
| 5,913,727 | A * | 6/1999 | Ahdoot ........................... 463/39 |
| 5,957,854 | A | 9/1999 | Besson et al. |
| D439,981 | S | 4/2001 | Kasabach et al. |
| 6,230,970 | B1 | 5/2001 | Walsh et al. |
| 6,275,143 | B1 | 8/2001 | Stobbe |
| 6,278,499 | B1 | 8/2001 | Darbee et al. |

(Continued)

FOREIGN PATENT DOCUMENTS

| EP | 1070479 A2 | 1/2001 |
| EP | 1292218 B1 | 4/2006 |

(Continued)

OTHER PUBLICATIONS

Berrou, et al. Near Shannon limit error-correcting coding and decoding: Turbo-codes. 1. IEEE Int. Conf. Commun., vol. 2, Geneva, Switzerland, May 1993, p. 1064-1070.

(Continued)

*Primary Examiner* — Amare Mengistu  
*Assistant Examiner* — Stacy Khoo  
(74) *Attorney, Agent, or Firm* — Wilson Sonsini Goodrich & Rosati

(57) ABSTRACT

Provided herein is a wearable interface for providing information from a user to a control unit comprising at least one wearable patch in communication with the control unit, wherein the patch is adaptable to detect object data and transmit the object data to the control unit. Further provided herein is a parameter determining patch for detecting object data from an object, the parameter determining sensor comprising at least one wearable data obtaining patch adaptable to obtain data from an object; and at least one transmitter for transmitting object data. Also included herein are a system and method of use of the invention.

33 Claims, 3 Drawing Sheets

(56) References Cited

U.S. PATENT DOCUMENTS

| | | | |
|---|---|---|---|
| 6,295,461 B1 | 9/2001 | Palmer et al. | |
| D451,604 S | 12/2001 | Kasabach et al. | |
| 6,336,900 B1 | 1/2002 | Alleckson et al. | |
| D460,971 S | 7/2002 | Sica et al. | |
| 6,436,058 B1* | 8/2002 | Krahner et al. | 600/587 |
| 6,454,708 B1 | 9/2002 | Ferguson et al. | |
| 6,463,039 B1 | 10/2002 | Ricci et al. | |
| 6,494,829 B1 | 12/2002 | New et al. | |
| 6,527,711 B1 | 3/2003 | Stivoric et al. | |
| 6,595,929 B2 | 7/2003 | Stivoric et al. | |
| 6,605,038 B1 | 8/2003 | Teller et al. | |
| 6,677,852 B1 | 1/2004 | Landt | |
| 6,694,180 B1 | 2/2004 | Boesen | |
| 6,731,962 B1 | 5/2004 | Katarow et al. | |
| 6,885,191 B1 | 4/2005 | Gleman | |
| 6,893,396 B2 | 5/2005 | Schulze et al. | |
| 6,909,420 B1 | 6/2005 | Nicolas et al. | |
| 7,020,508 B2 | 3/2006 | Stivoric et al. | |
| 7,103,578 B2 | 9/2006 | Beck et al. | |
| 7,125,382 B2 | 10/2006 | Zhou et al. | |
| 7,206,630 B1 | 4/2007 | Tarler | |
| 7,270,633 B1 | 9/2007 | Goscha et al. | |
| 7,294,105 B1 | 11/2007 | Islam | |
| 7,376,234 B1 | 5/2008 | Gardiner | |
| 7,382,247 B2 | 6/2008 | Welch et al. | |
| 7,571,369 B2 | 8/2009 | Wang et al. | |
| 7,602,301 B1* | 10/2009 | Stirling et al. | 340/573.1 |
| 7,603,255 B2* | 10/2009 | Case et al. | 702/182 |
| 7,733,224 B2* | 6/2010 | Tran | 340/540 |
| 7,969,307 B2 | 6/2011 | Peeters | |
| 8,611,319 B2 | 12/2013 | Magar et al. | |
| 8,926,509 B2 | 1/2015 | Magar et al. | |
| 2001/0003163 A1* | 6/2001 | Bungert et al. | 700/12 |
| 2001/0047127 A1 | 11/2001 | New et al. | |
| 2002/0065828 A1 | 5/2002 | Goodspeed | |
| 2003/0004403 A1 | 1/2003 | Drinan et al. | |
| 2003/0139903 A1 | 7/2003 | Zweig et al. | |
| 2003/0219035 A1* | 11/2003 | Schmidt | 370/478 |
| 2003/0236103 A1 | 12/2003 | Tamaki et al. | |
| 2004/0013097 A1 | 1/2004 | Massa | |
| 2004/0077975 A1 | 4/2004 | Zimmerman | |
| 2004/0199056 A1 | 10/2004 | Husemann et al. | |
| 2004/0236192 A1 | 11/2004 | Necola Shehada et al. | |
| 2005/0035852 A1 | 2/2005 | Paulsen | |
| 2005/0090718 A1 | 4/2005 | Dodds | |
| 2005/0101841 A9 | 5/2005 | Kaylor et al. | |
| 2005/0113167 A1* | 5/2005 | Buchner et al. | 463/30 |
| 2005/0119533 A1 | 6/2005 | Sparks et al. | |
| 2005/0197680 A1 | 9/2005 | Delmain et al. | |
| 2005/0206518 A1 | 9/2005 | Welch et al. | |
| 2005/0282633 A1 | 12/2005 | Nicolas et al. | |
| 2006/0004303 A1 | 1/2006 | Weidenhaupt et al. | |
| 2006/0025657 A1 | 2/2006 | Rosenfeld et al. | |
| 2006/0031102 A1 | 2/2006 | Teller et al. | |
| 2006/0103534 A1 | 5/2006 | Arms et al. | |
| 2006/0122473 A1 | 6/2006 | Kill et al. | |
| 2006/0122474 A1 | 6/2006 | Teller et al. | |
| 2006/0173259 A1 | 8/2006 | Flaherty et al. | |
| 2006/0264767 A1* | 11/2006 | Shennib | 600/509 |
| 2007/0027388 A1 | 2/2007 | Chou | |
| 2007/0081505 A1 | 4/2007 | Roberts | |
| 2007/0087780 A1 | 4/2007 | Nassimi | |
| 2007/0100219 A1 | 5/2007 | Sweitzer et al. | |
| 2007/0135866 A1 | 6/2007 | Baker et al. | |
| 2007/0208233 A1 | 9/2007 | Kovacs | |
| 2007/0208262 A1 | 9/2007 | Kovacs | |
| 2007/0232234 A1 | 10/2007 | Inzerillo et al. | |
| 2007/0244383 A1 | 10/2007 | Talbot et al. | |
| 2007/0279217 A1 | 12/2007 | Venkatraman et al. | |
| 2007/0282218 A1* | 12/2007 | Yarden | 600/549 |
| 2008/0001735 A1* | 1/2008 | Tran | 340/539.22 |
| 2008/0054880 A1 | 3/2008 | Miyauchi et al. | |
| 2008/0065877 A1 | 3/2008 | Son et al. | |
| 2008/0119707 A1* | 5/2008 | Stafford | 600/365 |
| 2008/0139894 A1 | 6/2008 | Szydlo-Moore et al. | |
| 2008/0252596 A1* | 10/2008 | Bell et al. | 345/156 |
| 2009/0037670 A1 | 2/2009 | Rofougaran | |
| 2009/0054737 A1 | 2/2009 | Magar et al. | |
| 2009/0316618 A1 | 12/2009 | Fielding et al. | |
| 2010/0013607 A1 | 1/2010 | Sabo et al. | |
| 2010/0049006 A1 | 2/2010 | Magar et al. | |
| 2010/0160746 A1 | 6/2010 | Venkatraman et al. | |
| 2010/0316043 A1 | 12/2010 | Doi et al. | |
| 2011/0019595 A1 | 1/2011 | Magar et al. | |
| 2011/0019824 A1 | 1/2011 | Sattiraju et al. | |
| 2012/0256492 A1 | 10/2012 | Song et al. | |
| 2014/0091947 A1 | 4/2014 | Magar et al. | |

FOREIGN PATENT DOCUMENTS

| | | |
|---|---|---|
| GB | 2420628 A | 5/2006 |
| JP | 2006055530 A | 3/2006 |
| KR | 10-2004-0032451 | 4/2004 |
| KR | 10-2004-0074056 | 8/2004 |
| KR | 2005-0072558 A | 7/2005 |
| KR | 1020050116274 * | 12/2006 |
| KR | 10-2007-0048168 | 5/2007 |
| WO | WO 89/02682 A1 | 3/1989 |
| WO | WO 89/04093 A1 | 5/1989 |
| WO | WO 89/04578 A1 | 5/1989 |
| WO | WO 98/10617 A1 | 3/1998 |
| WO | WO 02/25773 A1 | 3/2002 |
| WO | WO 02/064032 A2 | 8/2002 |
| WO | WO 02/064032 A3 | 2/2003 |
| WO | WO 03/015005 A2 | 2/2003 |
| WO | WO 03/015838 A2 | 2/2003 |
| WO | WO 03/015005 A3 | 12/2003 |
| WO | WO 2004/002301 A2 | 1/2004 |
| WO | WO 03/015838 A3 | 4/2004 |
| WO | WO 2004/002301 A3 | 4/2004 |
| WO | WO 03/015838 A3 | 5/2004 |
| WO | WO 2004/084720 A2 | 10/2004 |
| WO | WO 2004/084720 A3 | 3/2005 |
| WO | WO 2005/029242 A2 | 3/2005 |
| WO | WO 2005/029242 A3 | 6/2005 |
| WO | WO 2006/094513 A2 | 9/2006 |
| WO | WO 2006/094513 A3 | 4/2007 |
| WO | WO 2008/035151 A2 | 3/2008 |
| WO | WO 2008/097316 A1 | 8/2008 |
| WO | WO 2008/035151 A3 | 12/2008 |

OTHER PUBLICATIONS

International Search Report dated Nov. 19, 2007 for PCT application No. 2007/062772.

Vucetic, et al. Turbo Codes: Principles and Applications. The Kluwer International Series in Engineering and Computer Science). Kluwer Academic Publishers, 2000. (Table of Contents pages only) (8 pages).

UK combined search and examination report dated Sep. 12, 2011 for Application No. GB0815326.4.

International Search Report and written opinion dated Mar. 19, 2009 for PCT application No. 2008/073739.

International search report and written opinion dated Nov. 19, 2007 for PCT application No. 2007/062772.

International search report and written opinion dated Jan. 22, 2009 for PCT application No. 2008/080716.

International search report and written opinion dated Feb. 24, 2009 for PCT application No. 2008/073591.

International search report and written opinion dated Apr. 24, 2009 for PCT application No. 2008/081010.

Montemont, et al. Experimental comparison of discrete and CMOS charge sensitive preamplifiers for CZT radiation detectors IEEE Transactions on Nuclear Science. 2002; 50(4):936-941.

European search report dated Apr. 5, 2012 for EP Application No. 08841472.7.

UK combined search and examination report dated Jun. 26, 2012 for Application No. GB 1210339.6.

UK combined search and examination report dated Jun. 27, 2012 for Application No. GB 1210351.1.

Office action dated Feb. 13, 2013 for U.S. Appl. No. 12/739,519.

(56) References Cited

OTHER PUBLICATIONS

Office action dated Mar. 29, 2012 for U.S. Appl. No. 12/739,549.
Office action dated Apr. 3, 2012 for U.S. Appl. No. 12/739,519.
Office action dated May 2, 2011 for U.S. Appl. No. 12/134,151.
Office action dated Aug. 7, 2009 for U.S. Appl. No. 11/756,161.
Office action dated Oct. 5, 2012 for U.S. Appl. No. 12/739,549.
Office action dated Dec. 19, 2011 for U.S. Appl. No. 12/134,151.
Office action dated Jul. 9, 2013 for U.S. Appl. No. 12/096,195.
Office action dated Apr. 4, 2013 for U.S. Appl. No. 12/702,127.
U.S. Appl. No. 14/099,842, filed Dec. 6, 2013, Magar et al.
U.S. Appl. No. 14/537,736, filed Nov. 10, 2014, Magar et al.
Office action dated Nov. 6, 2014 for U.S. Appl. No. 14/099,842.
Notice of allowance dated Dec. 3, 2014 for U.S. Appl. No. 12/134,151.
Office action dated Feb. 27, 2014 for U.S. Appl. No. 12/134,151.
Notice of allowance dated Oct. 2, 2014 for U.S. Appl. No. 12/134,151.
European search report and search opinion dated Apr. 16, 2014 for EP Application No. 07757453.1.
Office action dated May 22, 2014 for U.S. Appl. No. 12/702,127.
Office action dated Jun. 19, 2014 for U.S. Appl. No. 12/096,195.
Office action dated Jul. 8, 2014 for U.S. Appl. No. 12/739,549.
Office action dated Mar. 5, 2015 for U.S. Appl. No. 12/739,549.

* cited by examiner

WEARABLE USER INTERFACE DEVICE, SYSTEM, AND METHOD OF USE

CROSS-REFERENCE

This application claims the benefit of U.S. Provisional Application No. 60/956,806, filed Aug. 20, 2007, which application is incorporated herein by reference.

BACKGROUND OF THE INVENTION

Computer gaming has become increasingly more realistic, with high resolution graphics, three-dimensional rendering, sophisticated interface devices, and internet multi-player games. Additionally, systems have been developed that allow the user to hold a structure that interfaces with a system, such as a joystick or remote, where the interface detects a player's motion. The system then incorporates the player's motion into a wireless application. Current systems require that user to hold the interface. In some situations the interface can be broken or the interface can break object when the user inadvertently released the interface. Additionally, current interface systems are only capable of detecting the arm movements. Finally, current systems are not capable of detecting other parameters from the user in order to incorporate the user information into the gaming system. Systems capable of doing this would enhance the user the experience.

SUMMARY OF THE INVENTION

Provided herein is an interface for providing information from a user to a control unit or data processing system comprising at least one wearable patch in communication with the control unit, wherein the patch is adaptable to detect object data and transmit the object data to the control unit. The patch can be adaptable to communicate with the control unit through at least one of narrowband and ultrawideband frequencies. The patch can comprise at least one sensor. Furthermore, the sensor can comprise at least one multipower radio. A multipower radio can function as both a narrowband radio and an ultrawideband radio. The patch can be used to detect object data, wherein the object data comprises at least one detectable parameter. The detectable parameter can comprise one or more of temperature, motion, heart rate, ECG, EEG, blood pressure, and hydration. In some embodiments, the patch can be further adaptable to provide feedback to the user. The feedback can be selected from one or more of on-screen instruction, shock, heat, or vibration. In some embodiments, the patch can be a disposable patch. The patch can be a flexible patch. The patch can be further adaptable to be positioned on an inanimate object. The patch can be further adaptable to be positioned on an animate object. In some embodiments of the patch, the object data detected is motion.

Another embodiment of the invention described herein comprises a parameter determining patch for detecting object data from an object, the motion determining sensor comprising at least one wearable data obtaining sensor adaptable to obtain data from an object; and at least one transmitter for transmitting object data. The transmitter can be adaptable to transmit data using at least one of narrowband and ultrawideband frequency. The transmitter can comprise at least one multimode radio. The transmitter can also work to receive information from an external source. In some embodiments, the patch can be adaptable to be in communication with a control unit. Additionally, the patch can comprise at least one receiver adaptable to receive data from an external unit. In some embodiments, the patch can be adaptable to stimulate the object with a stimulus. The stimulus can be selected from at least one of on-screen instruction, shock, heat, or vibration. The object data can be selected from at least one of motion, hydration, heart rate, ECG, EEG, blood pressure, and temperature.

Further provided herein are systems for incorporating information from an object comprising a control unit providing an output associated with an object, and at least one wearable patch in communication with the control unit. The wearable patch can be adaptable to be positioned on the object and further adaptable to detect at least one parameter from the object. Further, the control unit can be adaptable to adjust the output associated with the object in response to the parameter. The object can be an animate object. Alternatively, the object can be an inanimate object. In some embodiments, the parameter detected is movement. The movement can comprise at least one of displacement, velocity, acceleration, or any combination thereof. In some embodiments, the parameter can be a physiological parameter. The physiological parameter can be selected from at least one of temperature, hydration, heart rate, ECG, EEG, blood pressure, or any combination thereof. In some embodiments, the wearable patch can be adaptable to provide feedback to the object. The feedback can be physical feedback including, but not limited to at least one of vibration, electric shock, or change in temperature. Furthermore, the data processing system can be adaptable to provide feedback in response to the detected parameter. The feedback can be selected from at least one of audio feedback or visual feedback. Additionally, the system can further comprise at least one currently available data processing interface devices. Currently available data processing interface devices include, but are not limited to joysticks or remotes. The patch can comprise at least one sensor. The sensor can comprise at least one multimode radio.

Additionally provided herein are methods for interacting with a virtual environment of a control unit comprising positioning at least one wearable patch comprising at least one sensor on an object from which information is desired; acquiring information from the object using the at least one patch; incorporating the object information acquired into the virtual environment; and adjusting the virtual environment in response to the information from the object. The sensor can comprise at least one multipower radio. In some embodiments, the sensor is disposable. The sensor can be flexible. In some embodiments of the method, the positioning step can comprise positioning more than one sensor on the user. The object can be an animate object. Alternatively, the object can be an inanimate object. The sensor can be adaptable to acquire physiological data from an animate object. The physiological data can be selected from at least one of heart rate, ECG, EEG, blood pressure, hydration, speed, temperature, or any combination thereof. In some embodiments, the method can further comprise the step of providing feedback to the object through the patch. The feedback can be a stimulus applied to the user. Additionally, the method can further comprise the step of providing feedback to the object through the virtual environment. The feedback can be audio feedback or visual feedback. In some embodiments, the method further provides for the step of recording the object information. The object information can be recorded and stored and then used later to evaluate the progress of the user. Additionally, the method can comprise the step of recording the object information and then manipulating the recorded information virtually. In some embodiments of the method, the system is a gaming system. The method can further provide the use of a system that is adaptable to be adjusted in real time. Additionally, the method can further comprising the step of communicating the object information incorporated into the virtual environment with a second computer system accessing the same virtual environment.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Provided herein is an invention comprising at least one lightweight, flexible, and wearable patch that is capable of detecting at least one parameter from an object. The patch can comprise at least one sensor. The patch can further be capable of transmitting the parameter or parameters detected to a control unit, or data processor, which can then incorporate the parameter into a program. The program can be visually represented on a display, where the changes to the program are also visually represented on the display. The patch can further allow the data processing system to faithfully reproduce a computer representation of the user, which adds a new dimension of realism to the program. The users of such systems will have to deal with their own physical constraints. For example purposes only, in a fighting game, the strength of the punches or the ability of a user to run fast is determined by detecting a user's heart-rate and other physical factors. As another example, electrocardiogram (ECG) sensors can be included with the patch and can be used to provide feedback to other players in a team situation. The ability to see other player's heart rate can make it more difficult for players to bluff while playing cards.

The invention provides that a sensor patch can be placed on the surface of a user or object. In some embodiments, the sensor can be placed on an animate object, such as a human, or even an animal. Alternatively, the patch can be placed on an inanimate object such as, for example purposes only, a piece of sporting equipment. The sensor can measure a parameter from the user or object. In the case of an animate object, the sensor can detect a physiological parameter including, but not limited to, heart rate, hydration, blood pressure, ECG, electroencephalogram (EEC), and temperature. In some embodiments, the sensor can detect the movement of the user's body or movement of at least part of the user's body. The sensor can also be used to detect the spatial relationship between the user and an object or between multiple users. In some embodiments, the sensor can detect a single parameter. In some embodiments, the sensor can be used to detect multiple parameters. The sensor can also be placed on an inanimate object. For example, if the user is playing a tennis video game, the sensor can be placed on the user's own tennis racquet. The movement of the racquet can be detected by the patch. The patch can then send information regarding the movement to the system.

Figure 1:
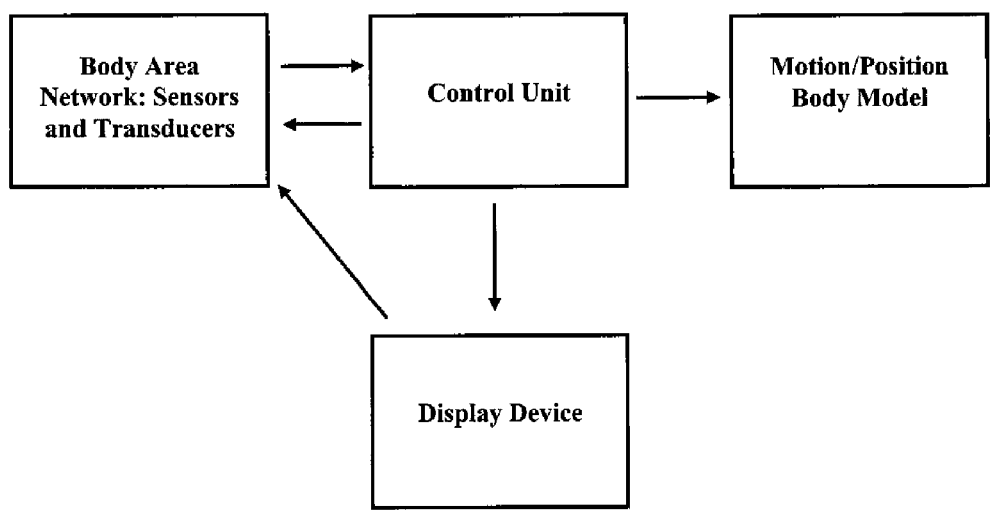
FIG. 1 illustrates a block diagram of the system.

Once information is detected by the sensor, the sensor can transmit this data to a data processor or control unit. FIG. 1 illustrates a block diagram of information transfer between various possible system components. The body network can be comprised of sensors and transducers in communication with the user or object. The body network is in communication with a control unit or data processor. The body network can be in electrical communication with the control unit. The control unit processes and combines the data from the patch sensors. The information from the patches can be sent to the control unit through a wireless link. Alternatively, the information can be sent to the control unit through a hard-wire connection. The control unit can be a gaming system. Alternatively, the control unit can be a medical device, for example purposes only, a heart rate monitor. The control unit can then adjust the program based on the data obtained by the patches. The program can adjust depending on the data from the user.

In some embodiments, the data processor or control unit can be connected to an output display, as illustrated in FIG. 1. The display can be used to illustrate a dynamic representation of the output, which can change in response to the input data from the sensor. In some embodiments, the output is displayed graphically. In some embodiments, the output is displayed pictorially. The output of the control unit can also relay information to display device depicting a motion or position body model. The output from the control unit can be used to show the user what the correct position or motion of a movement is. The output can further be used to show the user what their current position or movement looks like and how the user can change their movement or position to correct their positioning.

The patch can also serve as a user-interface. The patch can be used as an interface or input to a control unit, thereby allowing the user to manipulate the control unit. The control unit can then be used to manipulate an external object in response to the user's input.

Additionally, the invention described herein can be used to provide feedback to the user. As shown in FIG. 1, the feedback can comprise instructional feedback to the user. The feedback can be visual feedback from the display device. Additionally, the feedback can be audio feedback. In some embodiments, where the patches are used with a gaming system, the feedback can be temperature feedback, shock, vibration, or any combination thereof. The feedback can be delivered to the user through the same patches that are used to detect object data. Alternatively, the data can be obtained using a first set of patches, and the feedback can be delivered through a second set of patched.

In some embodiments, the user can obtain feedback instantaneously. In some embodiments, the data from the user can be detected by the patches while the user is in motion and then the patches can store the information collected. The information can then be downloaded to a mobile device for real-time use. Alternatively, the information can be stored by the patch and then downloaded at some point in time for delayed feedback.

I. DEVICES

Figure 2:
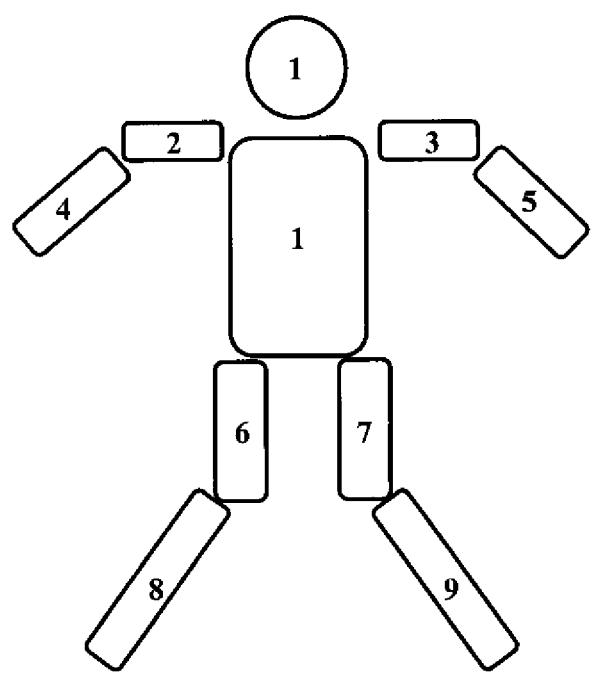
FIG. 2 illustrates a body model showing locations on the body where a sensor patch can be located.

Provided herein is a wearable patch that can be interfaced with a data processing system. At least one patch can be used with a system. In some embodiments, the invention can provide for the use of multiple patches to be used with the system. The patch can comprise at least one multipower radio. The multipower radio can be capable of transmitting data from the patch to a data processing system using either narrowband or ultrawideband frequencies. FIG. 2 illustrates a body model showing locations along the body where patches can be positioned. In some embodiment, patches at positions 4 and 5 of FIG. 2 can comprise patches placed on each finger. In some embodiments, patches at positions 8 and 9 of FIG. 2 can comprise patches placed on each toe. Patches can be positioned on the main part of each location shown in FIG. 2. Additionally, patches can be positioned at the joints. Patches can be positioned at any suitable location for positioning a patch. In some embodiments, five patches will be used; one on each arm, one on each leg, and one on the torso. In some embodiments, more than five patches can be used with the system. The more patches that are used the greater the sensitivity of the system.

The patches can be used to detect various parameters that can be used with a data processing system or any other suitable control system. The patches can comprise sensors including, but not limited to, accelerometers, temperature sensors, ECG sensors, EEG sensors, impedance sensors, moisture sensors, or any combination thereof. The sensors can detect parameters from the user or from an object. The detectable parameters include, but are not limited to, temperature, motion, heart rate, ECG data, EEG data, blood pressure, hydration, or any combination thereof. In some embodiments, the patches can be used as part of a feedback system. The ability of the patches to detect user limitations allows the limitations of the players to be included in the processing system. This can enhance the user's interaction with the system thereby providing a more realistic experience. In some embodiments, the patches can further comprise transducers including, but not limited to, vibrational transducers, electrical transducers, thermal transducers, or any combination thereof.

Figure 3:
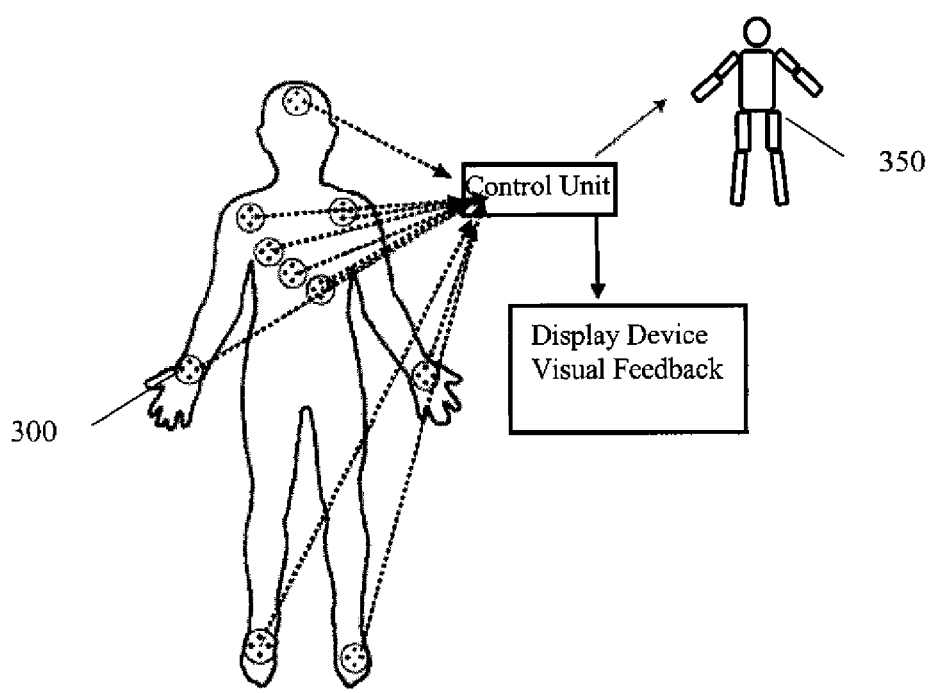
FIG. 3 illustrates the relationship between patches on the body and the piece model of the body.

The relationship between the patch position and the ten piece model is shown in FIG. 3. The patches 300 on the body are in communication, preferably electrical communication, with the control unit. The control unit can be in communication with a display device, which can provide visual feedback to the user. The control unit can also be in communication with a body model 350. The model can be updated in by the control unit with detecting motion and the position of the patches, in order to track the movement of the body. The ten piece model can be used to map the data from the accelerometers and translate this data into potential positions or locations of the various parts of the human body. A patch exists at time t1 at position 1 (x1, y1, z1) and exists at time t2 at position 2 (x2, y2, z2). Using a simple model of human motion, which can include an accurate representation of the range of motion of the joints, the algorithm can search for the possible set of matching motions that take the user's patches from the measured positioned 1 to position 2. Positions that are unlikely due to physical constraints of the user are discarded. The set of motions most consistent with the velocity vectors can be measured at the previous location, and can be used to render a three-dimensional version of the user. In this manner, the movements of the player are accurately captured and included in the system. The update time can vary depending on the program. In some embodiments, the update time is on the order of millisecond level feedback.

II. SYSTEMS

Further provided herein are systems for incorporating information from an object comprising a control unit providing an output associated with an object, and at least one wearable patch in communication with the control unit. The wearable patch can be adaptable to be positioned on the object and further adaptable to detect at least one parameter from the object. Further, the control unit can be adaptable to adjust the output associated with the object in response to the parameter. The object can be an animate object. Alternatively, the object can be an inanimate object. In some embodiments, the parameter detected is movement. The movement can comprise at least one of displacement, speed, or velocity, or any combination thereof. In some embodiments, the parameter can be a physiological parameter. The physiological parameter can be selected from at least one of temperature, hydration, heart rate, ECG, EEG, blood pressure, or any combination thereof. In some embodiments, the wearable patch can be adaptable to provide feedback to the object. The feedback can be physical feedback including, but not limited to at least one of vibration, electric shock, or change in temperature. Furthermore, the data processing system can be adaptable to provide feedback in response to the detected parameter. The feedback can be selected from at least one of audio feedback or visual feedback. Additionally, the system can further comprise at least one currently available data processing interface devices. Currently available data processing interface devices include, but are not limited to joysticks or remotes. The patch can comprise at least one sensor. The sensor can comprise at least one multipower radio.

III. METHODS

Additionally provided herein are methods for interacting with a virtual environment of a control unit comprising positioning at least one wearable patch comprising at least one sensor on an object from which information is desired; acquiring information from the object using the at least one patch; incorporating the object information acquired into the virtual environment; and adjusting the virtual environment in response to the information from the object. The sensor can comprise at least one multipower radio. In some embodiments, the sensor is disposable. The sensor can be flexible. In some embodiments of the method, the positioning step can comprise positioning more than one sensor on the user. The object can be an animate object. Alternatively, the object can be an inanimate object. The sensor can be adaptable to acquire physiological data from an animate object. The physiological data can be selected from at least one of heart rate, ECG, EEG, blood pressure, hydration, speed, temperature, or any combination thereof. In some embodiments, the method can further comprise the step of providing feedback to the object through the patch. The feedback can be a stimulus applied to the user. Additionally, the method can further comprise the step of providing feedback to the object through the virtual environment. The feedback can be audio feedback or visual feedback. In some embodiments, the method further provides for the step of recording the object information. The object information can be recorded and stored and then used later to evaluate the progress of the user. Additionally, the method can comprise the step of recording the object information and then manipulating the recorded information virtually. In some embodiments of the method, the system is a gaming system. The method can further provide the use of a system that is adaptable to be adjusted in real time. Additionally, the method can further comprising the step of communicating the object information incorporated into the virtual environment with a second computer system accessing the same virtual environment.

IV. EXAMPLES

Example 1

Interactive Exercise Videos

The invention described herein can be used with an interactive exercise video. The user will attach patches to their body at various locations, such an on the arms and legs and torso. The user can then follow an on screen coach while performing various exercises such as yoga or Pilates or other stretching moves. Alternatively, the user can perform various aerobic exercises or weight lifting routines. The feedback from the patches can then be used to assess how well the user is performing the requested tasks. A visual display can show the user what corrective measures need to be taken, if any. For example, if a user is not performing a stretch properly, the system can indicate this to the user. A computer coach can provide real-time feedback to the user through visual or audio cues. Additionally, physiological parameters, such as heart rate, can be detected to determine whether the user is over-exerting himself or herself and the system can adjust dynamically to compensate for the user's ability. The system can also adjust to maximize the desired result for the user, such as weight loss or aerobic strength.

Example 2

Virtual Reality Gaming Systems

The invention described herein can be used in conjunction with a completely tetherless player who wears virtual reality goggles to immerse himself or herself into a game. The video game player can now move around and the feedback of the player's position and movement is closely tracked. The tracked information can be used to update the scenery in the virtual environment. The transducers can be used to reinforce the visual feedback. For instance, invisible objects can be illuminated in virtual reality and if the player touches one of these invisible objects with his body, a transducer signal can be used to provide feedback (such as vibration or shock). The user can run, jump, kick or do anything possible within the confines of his or her environment and these movements and motions can be accurately tracked and recreated for the game. The game system can be set up so that other users of the game can see a virtual version of the player and the player's movements, even though users are located at different locations.

Example 3

Animated Sequences for Motion Pictures and Gaming

The invention described herein can be used to create animated sequences for motion pictures or for the gaming industry. Typically, simple light sensors (white dots) are used to pick-up signals in a video sequence. The locations of these light markers are used to move a computer animated character in sequence. The current system requires wearing a special uniform with marker tags. Using the invention described herein, the patches can be used to record the location and position of the patches automatically. The software can be used to track the motion of the actor for the use in movies or games. More complex scenes can be rendered in three-dimension as normal action sequences involving multiple characters are rendered in their natural setting.

Example 4

Medical Applications

The invention described herein can be used with medical devices. The patches of the invention can be used to assist remote diagnosis of motor impairments. The patches can be placed on the area surrounding a joint that has limited movement. The motion can then be tracked and the range of motion used to determine the extent of an injury. Furthermore, the patches can be used for training and recovery exercises to evaluate the progression of recovery.

Example 5

Virtual Surgery

The patches can also be used to track the fine movement of the arms, wrist joints, and fingers, to aid in surgical operations. A surgeon can wear patches instead of wearing gloves. The surgeon can then use the gloves to grip medical equipment directly and manipulate objects. The motion of the patches can be recorded and used to manipulate a robotic surgical arm. In cases where internal surgery is needed to be performed, a model of the surgical area can be created in virtual reality. As the surgeon manipulates objects and performs surgery in a virtual reality environment, a robotic surgeon can perform surgery on an actual patient by recreating the movements of the surgeon. Additionally, the patches can be used to train a surgeon in a virtual reality environment. The surgeon can practice operating on a virtual reality patient. The system can provide feedback to the surgeon as they perform the surgical procedure. This can provide the surgeon with training and an impartial method for evaluating a surgeon's skills.

Example 6

Sport Training Systems

The patches can be used with systems for use in training athletes. For example, a golfer can use a system to improve his or her golfing technique. A patch can be placed at various positions on the golfer. A patch can also be placed on the club that the golfer actually plays golf with. The golfer can then use the system to evaluate his or her swing which takes into consideration the actual club the golfer plays with. The system can then provide instruction to the user on how to improve his or her swing based on the virtual performance of the golfer as measured by the system.

Example 7

Video Game Systems with Wearable Patches

The invention described herein can be used with gaming systems. The patches can be used with games where the user plays the game from a stationary position. The user's arm movements or leg movements need to be tracked in order to provide feedback in games involving fighting, dancing, or playing sports. The patches, worn at unobtrusive positions on the body can be used to track movement. This is unlike current systems where motion detectors, such as accelerometers, are incorporated into joysticks or game interface devices. The wearable patches are light-weight, thin, and low-powered. The patches can be worn at multiple locations. The game can detect the number of patches being used. The user will then undergo a calibration sequence with the system in order for the system to learn the location of the patches and the player's mobility. The calibration sequence can consist of a series of motions, such as moving the limbs around, jumping, or perform any other suitable task for calibrating the system.

Example 8

User Interface for Mobility Impaired Patients

The patch can function to serve as a user-interface between a user and an object. The patch allows the user to manipulate a data processor or control unit so that the control unit can produce the effects of the user's manipulation. Such a user-interface system can be used to control an object. For example purposes only, a patch can be placed on a motor-impaired person's head. The patch can comprise at least one EEG sensor. The EEG sensor can detect electrical activity from the user's brain and this information can be sent to a control unit located in communication with a wheel chair. The user can think of directions in which he or she wishes to travel. The patch can pick up these directions and the chair can then be controlled by the control unit to move in the desired directions.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for interacting with a virtual environment of a system, comprising:
   a) positioning at least one wearable patch on a user, the wearable patch comprising (i) a motion sensor adapted to collect motion information from said user and provide said motion information to said system in communication with said wearable patch, and (ii) a physiological sensor to acquire physiological data from said subject;
   b) using said motion sensor of the at least one wearable patch to acquire motion information and said physiological data relating to the user;
   c) searching, with the aid of a processor, for a matching motion that is consistent with motion information acquired in b) and discarding motions that are un unlikely due to physical constraints of said user, thereby accurately capturing the movements of the user;
   d) rendering, with the aid of a processor, a three-dimensional representation of said user using a set of motions most consistent with velocity vectors associated with said matching motion of c);
   e) incorporating said rendered three-dimensional representation of said user into the virtual environment;
   f) adjusting the virtual environment in response to (i) the three-dimensional representation of the user incorporated in e) and (ii) said motion information acquired in b), said adjusting comprising updating a scenery of the virtual environment;
   g) displaying, to said user, the virtual environment comprising said rendered three-dimensional representation of said user; and
   h) providing, in response to said adjusted virtual environment of f), feedback to the user using the at least one wearable patch, wherein the feedback is a stimulus that comprises at least one of: shocking the user, changing a temperature of the user, vibrating the user, and controlling movement of the user.

2. The method of claim 1 wherein the wearable patch comprises at least one multipower radio that is adapted to communicate with said system.

3. The method of claim 1 wherein the wearable patch is disposable.

4. The method of claim 1 wherein the wearable patch is flexible.

5. The method of claim 1 wherein a) comprises positioning a plurality of wearable patches on the user, each of said plurality of wearable patches having a motion sensor adapted to collect and provide motion information relating to the movement of said user.

6. The method of claim 1 wherein, in f), said virtual environment is adjusted dynamically in response to said acquired physiological data to compensate for the user's ability.

7. The method of claim 6 wherein the physiological data is selected from at least one of heart rate, hydration, speed, temperature, electrocardiogram data, electroencephalogram data, and blood pressure.

8. The method of claim 1 further comprising the step of providing feedback to the user through the virtual environment.

9. The method of claim 8 wherein the feedback is audio feedback.

10. The method of claim 8 wherein the feedback is video feedback.

11. The method of claim 8 wherein the feedback is on-screen instruction.

12. The method of claim 1 further comprising recording the motion information acquired in b).

13. The method of claim 12 wherein said recording further comprises manipulating the motion information.

14. The method of claim 1 wherein the system is a gaming system.

15. The method of claim 1 wherein the system is adapted to be adjusted in real time.

16. The method of claim 1 further comprising communicating the three-dimensional representation of the user with a second system accessing the virtual environment.

17. The method of claim 1 further comprising the wearable patch receiving data from the system, and wherein, in g), feedback is provided to said user in response to said data.

18. The method of claim 1 wherein said wearable patch comprises one or more additional sensors that detect at least one of temperature, heart rate, electrocardiogram data, electroencephalogram data, blood pressure, and hydration.

19. The method of claim 1 wherein said wearable patch comprises one or more additional sensors that detect a limitation of the user, and wherein, in f), said virtual environment is adjusted in view of said limitation.

20. The method of claim 1, wherein the wearable patch communicates with the system through at least one of narrowband and ultrawideband frequencies.

21. The method of claim 1 wherein the feedback provided is in response to the motion information acquired in b).

22. The method of claim 1, wherein said motion sensor is an accelerometer.

23. The method of claim 1, wherein said motion information includes one or more velocity vectors related to the movement of said user.

24. The method of claim 1, further comprising (i) using said motion information acquired in b) to assess how well said user is performing requested tasks, and (ii) rendering said three-dimensional representation with corrective measures.

25. The method of claim 1, wherein said virtual environment is adjusted to maximize a desired result selected by said user.

26. The method of claim 1, wherein in (c), said matching motion is determined using a model of human motion including a representation of the range of motion of joints.

27. A method for interacting with a virtual environment of a system, comprising:
   a) positioning a wearable patch on a part of user, the wearable patch comprising a first sensor and a second sensor, wherein said first sensor is adapted to collect motion data from said user and transmit said motion data to said system, and wherein said second sensor is adapted to collect physiological data from said user and transmit said physiological data to said system;
   b) acquiring, with the aid of the first and second sensors of the wearable patch, motion data and physiological data from said user;
   c) searching, with the aid of a processor, for a matching motion that is consistent with said motion data obtained in b) and discarding motions that are unlikely due to physical constraints of said user, thereby accurately capturing the movements of the user;
   d) rendering, with the aid of a processor, a three-dimensional representation of said user using a set of motions most consistent with velocity vectors associated with said matching motion of c);
   e) adjusting the virtual environment in response (i) to the rendered three-dimensional representation and said physiological data, and (ii) said motion data acquired in b), said adjusting comprising updating a scenery of the virtual environment; and
   f) displaying, to said user, the virtual environment comprising said rendered three-dimensional representation of said user.

28. The method of claim 27, wherein said motion data acquired in b) includes one or more velocity vectors related to the movement of said user.

29. The method of claim 27, further comprising determining, with the aid of a processor, an exertion of said user using said physiological data acquired in b).

30. The method of claim 29, wherein, in e), said virtual environment is adjusted in response to said exertion.

31. The method of claim 27, wherein said physiological data is selected from the group consisting of temperature, heart rate, electrocardiogram data, electroencephalogram data, blood pressure, and hydration.

32. The method of claim 27, wherein said first sensor is an accelerometer.

33. The method of claim 27, further comprising (i) using said motion data acquired in b) to assess how well said user is performing requested tasks, and (ii) rendering said three-dimensional representation with corrective measures.

* * * * *

UNITED STATES PATENT AND TRADEMARK OFFICE
CERTIFICATE OF CORRECTION

| | | |
|---|---|---|
| PATENT NO. | : 9,046,919 B2 | Page 1 of 1 |
| APPLICATION NO. | : 12/193865 | |
| DATED | : June 2, 2015 | |
| INVENTOR(S) | : Ali Niknejad | |

It is certified that error appears in the above-identified patent and that said Letters Patent is hereby corrected as shown below:

In the Claims;

Column 9, Line 46, Claim 1 add --and said physiological sensor-- after motion sensor.

Column 9, Line 47, Claim 1 add --said-- after to acquire.

Signed and Sealed this
Twelfth Day of January, 2016

Michelle K. Lee
*Director of the United States Patent and Trademark Office*